US010689010B2

(12) United States Patent
Muguerza

(10) Patent No.: US 10,689,010 B2
(45) Date of Patent: Jun. 23, 2020

(54) ELEVATED TRANSPORTATION SYSTEM

(71) Applicant: ETran, Inc., San Antonio, TX (US)

(72) Inventor: Joaquin Juan Bosco Garza Muguerza, San Antonio, TX (US)

(73) Assignee: ETran, Inc., San Antonio, TX (US)

( * ) Notice: Subject to any disclaimer, the term of this patent is extended or adjusted under 35 U.S.C. 154(b) by 329 days.

(21) Appl. No.: 15/852,945

(22) Filed: Dec. 22, 2017

(65) Prior Publication Data

US 2018/0178813 A1 Jun. 28, 2018

Related U.S. Application Data

(60) Provisional application No. 62/437,977, filed on Dec. 22, 2016.

(51) Int. Cl.
| | | |
|---|---|---|
| *B61B 5/00* | (2006.01) | |
| *B61B 13/08* | (2006.01) | |
| *B61B 1/02* | (2006.01) | |
| *B61B 13/12* | (2006.01) | |
| *B61G 5/02* | (2006.01) | |

(52) U.S. Cl.
CPC ............. *B61B 5/00* (2013.01); *B61B 1/02* (2013.01); *B61B 13/08* (2013.01); *B61B 13/127* (2013.01); *B61G 5/02* (2013.01); *Y02T 30/40* (2013.01)

(58) Field of Classification Search
CPC ........ B61B 13/08; B61B 13/127; B61B 1/02; B61B 5/00; B61B 13/04; B61B 5/025; B61B 13/00; B61G 5/02; Y02T 30/40; B61C 11/00
See application file for complete search history.

(56) References Cited

U.S. PATENT DOCUMENTS

| | | | |
|---|---|---|---|
| 2,111,676 A | 3/1938 | Ritchie | |
| 3,163,124 A | 12/1964 | Hendrix | |
| 3,498,234 A * | 3/1970 | Roumejon | B60V 3/04 |
| | | | 104/23.2 |
| 3,735,710 A * | 5/1973 | Hickman | B61B 13/127 |
| | | | 104/168 |
| 4,703,697 A * | 11/1987 | Bell | B61C 11/06 |
| | | | 104/134 |
| 5,275,111 A * | 1/1994 | Saviccevic | B61B 13/10 |
| | | | 104/121 |
| 5,299,507 A * | 4/1994 | Maynard, Sr. | E01B 25/00 |
| | | | 104/124 |
| 7,137,343 B2 | 11/2006 | Pulliam | |
| 7,490,557 B2 | 2/2009 | Pulliam | |
| 7,992,501 B2 | 8/2011 | Pulliam | |
| 2004/0123766 A1 | 1/2004 | Van Den Bergh et al. | |

(Continued)

FOREIGN PATENT DOCUMENTS

FR 1440601 A * 6/1966 ........... B61B 13/127

OTHER PUBLICATIONS

PCT International Search Report, PCT/US2017/68236, dated May 11, 2018.

(Continued)

*Primary Examiner* — Mark T Le
(74) *Attorney, Agent, or Firm* — Vinson & Elkins L.L.P.

(57) ABSTRACT

An elevated transportation system includes a multicompartment fuselage adapted to run on a series of spaced apart stanchions in which the motive force for the fuselage is located in motorized rollers disposed on each stanchion.

30 Claims, 12 Drawing Sheets

(56) References Cited

U.S. PATENT DOCUMENTS

2005/0076802 A1\* 4/2005 Pulliam ................ B61B 13/127
                                                                                     104/125
2007/0095245 A1    3/2007 Li
2009/0158955 A1    6/2009 Pulliam

OTHER PUBLICATIONS

International Preliminary Report, PCT/US20171068235 dated May 3, 2019.
Response to Written Opinion under Article 34; PCT/US20171068236, dated Oct. 3, 2018.
PCT Chapter II Demand; PCT/US20171068236, dated Oct. 3, 2018.
Article 34 Replacement Claims; PCT/US20171068236, dated Oct. 3, 2018.

\* cited by examiner

ELEVATED TRANSPORTATION SYSTEM

CROSS REFERENCE TO RELATED APPLICATIONS

This application claims benefit of priority to U.S. Provisional Application No. 62/437,977, filed Dec. 22, 2016, the entire contents of which are incorporated herein by reference.

BACKGROUND

The railway train system as we know it today is said to have evolved from a system Welsh coal miners devised to move coal out of a mine shaft at the beginning of the industrial revolution. The miners first placed coal into wooden-wheeled wagons and rolled them on wooden planks placed over the muddy ground up and out of a sloping mine shaft. The wooden wheels and planks were soon replaced by ones made of iron and a mule was added to pull the wagon. The iron planks eventually gave way to an iron rail, the iron wheels were attached to ever larger carriages and the mule replaced by an engine in a locomotive. Despite the various advances, the fundamental concept of steel wheel on steel rails persists through today. Even magnetic levitation based train systems maintain a continuous rail as both guide and support for the force field.

The basic railway train system employs the following set of essential components: (1) steel wheels, (2) steel rails, (3) railroad bridges, (4) roadbeds, (5) a propulsion source, and (6) rail cars. The steel wheels, which are attached to the passenger car, run on the steel rails. This method produces a low coefficient of friction and has been a very economical method of transportation. Railroad bridges are devices used to span open spaces where it is not possible to have a continuous roadbed. Importantly, the railroad bridge must carry its own weight and that of the train. The roadbed (in the form of the ground or the railroad bridge) is an accumulation of mass that holds the rails formed as tracks in place and distributes the forces generated by the passing train. Propulsion in the form of a locomotive or motor contained within the passenger cars must also be present to push or pull the train along. Then there must be rail cars, such as passenger cars or freight cars, which are compartments that function to safely transport passengers or freight.

Although the basic railway train system is partially responsible for transforming human civilization from the industrial revolution to modern times, it is not without its problems. In the present day, a basic railway train system is extremely costly to construct. The cost of building new urban rail systems has risen beyond reach for most municipalities and regional planners. For example, the cost for Los Angeles Blue Line escalated from $194 million to $890 million, while Buffalo's $24 million tab ballooned to $552 million. As of December of 2011 the estimated cost for the construction of light rail ranged from $130 to $150 million dollars per mile. These extremely high costs are primarily due to the costs of land acquisition and disruptions to existing infrastructure.

There is a need, therefore, for a mass transportation system that operates without reliance on steel wheels riding on rails.

SUMMARY

The present disclosure overcomes at least certain drawbacks of the prior art by providing a transportation system that includes elevated, rail less transport of passengers, and/or freight in an automated system of separate individual stanchions that can be placed in existing rights of way, both urban and rural, without disturbing conventional transportation or other activities. While the system is described as rail less, it is understood that in certain embodiments, two or more stanchions can be connected by side rails to stabilize and guide the fuselage as it travels through particular areas such as curves or steep grades, for example. The side rails can be tubular shaped and adapted to provide structures to contact and interact with rollers that are part of shock absorbing systems disposed on the sides of a fuselage. A fuselage comprised of articulated joints, compartments or sections travels through and is driven and guided by the stanchions without requiring continuous rails as in a conventional train system. As described above, one or both sides of the fuselage can include sets of rollers that are part of shock absorbing systems. The rollers, when present, can include one or more linear actuators adapted to move the rollers to a position that allows the rollers to contact the side rails to guide and stabilize the fuselage as required by curves, grades or other features of the route. The linear actuator can moves the rollers into position to contact the side rails and can also move the rollers into a storage position when not in use, effective to minimize aerodynamic drag on the fuselage. The fuselage can also contain internal power and electrical systems for powering lights, temperature control, any hydraulic or electromotive systems, opening and closing of doors, communication with a central control center and with passengers, and other operational features.

In certain embodiments the disclosed transportation system provides at least the following, advantageous properties:

(a) There is no engine in the fuselage;
(b) There are no rails or steel wheels;
(c) There can be one or more guiding side rails linking one or more stanchions in the curves, or where deemed necessary or convenient,
(d) At least three stanchions grip the vehicle at all times;
(e) The stanchions and support systems on top of them, can be adjusted in every direction;
(f) The vehicle includes an articulated fuselage, allowing it to make turns and move uphill and downhill;
(g) The system uses mechanical/electrical/hydraulic linear actuators to control and position the fuselage sections in the vertical and horizontal directions;
(h) Electric motors housed in the stanchions supply the propulsion to the vehicle;
(i) Rollers keep the fuselage aligned and gripped at all times;
(j) The fuselage is comprised of two major components, the undercarriage and the body;
(k) The fuselage is comprised of several sections, joined together by an articulation system and linear actuators.
(l) Laser sensors between stanchions monitor, detect and signal any misalignment between them;
(m) The system is optionally at least partially powered by alternative energy sources, like solar and wind, or hydrogen fuel cells;
(n) The length and interior design of the fuselage and the speed of the vehicle are determined by the specific requirements of the application (line); and
(o) The transportation system ("Etran") is optionally a fully automated system that can be controlled by a centralized control center.

In certain embodiments the stanchions provide electrically powered motive forces that propel a vehicle from stanchion to stanchion, can generate their own power through solar cells for example, and can also provide sensors to detect an approaching vehicle and activate or deactivate the motive force without a central control or driver of the vehicle. The system can also include stations, docks or depots for loading and unloading passengers or freight and in certain embodiments a centralized control station for scheduling and tracking of routes.

In certain embodiments passengers can enter the vehicle in an elevated station that can be dedicated to the disclosed system or can be incorporated into a conventional rail station. When the vehicle is loaded, a signal from a central controller can initiate the motive force in the stanchions within the station to propel the vehicle to the next stanchion, which provides a motive force when its sensors indicate an approaching vehicle. It is a further aspect of the disclosed system that stanchions in the destination station provide a braking force which stops the vehicle upon arrival.

In certain embodiments the system can provide a vehicle of "flat cars" that are transported to a dock, for example, and automatically loaded with freight containers adapted to be transported in the described system. The freight can be transported through the same stanchion system used for passenger vehicles or it can be transported through stanchions adapted for freight only. The freight containers can be transported to a dock or other location where they are automatically unloaded and loaded onto trucks or conventional rail systems, for example, for further transport or into warehouses.

The disclosure can be described in certain embodiments as a transportation system that includes one or more vehicles, each vehicle including a fuselage body with an upper fuselage body and a lower fuselage body wherein the fuselage body further comprises a plurality of compartments linearly joined by articulating joints between adjoining compartments and a plurality of stanchions spaced apart to provide a transportation system route, wherein each stanchion includes a pillar with a top end and a bottom end wherein the bottom end is secured to the ground or a stable base and a platform attached to the top end of the pillar, wherein the platform includes one or more grooves formed in the platform, wherein at least one groove includes an upper groove and a lower groove, the lower groove including an upper surface and a bottom surface, wherein the upper groove is adapted to provide a channel for the upper fuselage body and the lower groove is adapted to provide a channel for the lower fuselage body, and a first set of rollers mounted proximate to the bottom surface of the lower groove and adapted to contact the lower fuselage body when a fuselage passes through the groove, a second set rollers mounted proximate to the upper surface of the lower groove and adapted to contact the lower fuselage body when a fuselage passes through the groove, an electric motor functionally connected to the first and second set of rollers effective to provide motive force to said first and second set of rollers; and a power source functionally connected to said motor.

In certain embodiments the stanchions are spaced apart at a distance at which a fuselage traveling on the route provided by the stanchions can be supported by 3 stanchions while traveling and, wherein one or more stanchions can linked by side rails. The fuselage can include one or more of mechanical, electrical or hydraulic linear actuators adapted to move at least a portion of a fuselage compartment vertically, horizontally or a combination thereof. In certain embodiments the first and second set of rollers can provide the entire propulsion force to the fuselage, and a fuselage compartment can be adapted to transport passengers, freight, cargo or a combination thereof. The transportation system can also include one or more laser sources and sensors between two stanchions adapted to monitor, detect and signal any misalignment between the two stanchions. In certain embodiments at least one of the electric motors can be functionally connected to the first and second set of rollers and can be powered by at least one of solar energy, wind energy or hydrogen fuel cell. The system can also include a centralized control system in communication with one or more fuselages, stanchions or a combination thereof.

In certain alternate embodiments the disclosure can be described as a stanchion adapted to support an elevated train fuselage, wherein a stanchion can include a pillar comprising a top end and a bottom end wherein the bottom end is secured to the ground or a stable base, a platform attached to the top end of the pillar, wherein the platform includes a groove built into the platform, the groove formed as an upper groove and a lower groove, the lower groove having an upper surface and a bottom surface, wherein the upper groove can be adapted to provide a channel for an upper fuselage body of a vehicle and the lower groove can, be adapted to provide a channel for the lower fuselage body of a vehicle, a first and a second set of rollers mounted proximate to the bottom surface of the lower groove and adapted to contact the lower fuselage body when a fuselage passes through the groove, a second set rollers mounted proximate to the upper surface of the lower groove and adapted to contact the lower fuselage body when a fuselage passes through the groove, an electric motor functionally connected to the first and second set of rollers effective to provide motive force to said first and second set of rollers, and a power source functionally connected to the motor.

In certain embodiments the groove is shaped to contain a vehicle including a fuselage body that has an upper fuselage body and a lower fuselage body, wherein the fuselage body further has a plurality of compartments linearly joined by articulating joints between each compartment, and in which the first and second set of rollers can provide forward or reverse propulsion. In certain embodiments a stanchion can include a third set of rollers disposed on the upper surface of the lower groove and adapted to provide a downward stabilization force to a vehicle disposed in said groove. A stanchion can also include at least a second groove, each groove configured to contain separate vehicles.

In certain alternative embodiments, the disclosure can include a vehicle, in which the vehicle includes a plurality of linearly connected compartments that can form a fuselage body wherein the compartments are connected by articulating joints, a fuselage base formed under the fuselage body and extending along the length of the fuselage body, and a running rail formed as an indentation along a bottom surface of the fuselage base, the indentation adapted to contact powered rollers effective to propel the vehicle. A running rail can be formed with an upper portion proximate to the fuselage body and a lower portion distal from the fuselage body, the lower portion being wider than the upper portion and extending laterally outwards to form stabilization tips.

In certain embodiments a vehicle articulation joint can include an upper mechanical articulation and a lower mechanical articulation and at least two sets of active actuators wherein each mechanical articulation can include two or more interlocking rigid elements; and a center pivot; and wherein each set of active actuators can include individual actuators. A lower mechanical articulation can located on the lower portion or on the bottom of the fuselage base and the rigid elements can interlock around the center pivot.

In certain embodiments the upper mechanical articulation can located on the fuselage body or at the top of the fuselage body and can include interlocking rigid elements on each articulation joint interlocked around the center pivot. One or more of the actuators can be controlled from the fuselage, or they can be controlled remotely.

In certain embodiments the disclosure can be described as a method of providing an elevated train system including providing one or more vehicles, each vehicle can include a fuselage body comprising an upper fuselage body and a lower fuselage body, wherein the fuselage body further can include a plurality of compartments linearly joined by articulating joints between adjoining compartments; providing a plurality of stanchions spaced apart to provide a transportation system route, wherein each stanchion can include a pillar including a top end and a bottom end wherein the bottom end is secured to the ground or a stable base; a platform attached to the top end of the pillar, wherein the platform can include one or more grooves formed in the platform, wherein at least one groove can include an upper groove and a lower groove, the lower groove can include an upper surface and a bottom surface, wherein the upper groove can be adapted to provide a channel for the upper fuselage body and the lower groove can be adapted to provide a channel for the lower fuselage body; a first set of rollers mounted proximate to the bottom surface of the lower groove and adapted to contact the lower fuselage body when a fuselage passes through the groove; a second set rollers mounted proximate to the upper surface of the lower groove and adapted to contact the lower fuselage body when a fuselage passes through the groove, an electric motor functionally connected to the first and second set of rollers effective to provide motive force to said first and second set of rollers, and a power source functionally connected to the motor.

BRIEF DESCRIPTION OF THE DRAWINGS

These and other features, aspects, and advantages of the present disclosure will become better understood with regard to the following description, appended claims, and accompanying drawings where:

DESCRIPTION OF THE PREFERRED EMBODIMENTS

Figure 1:
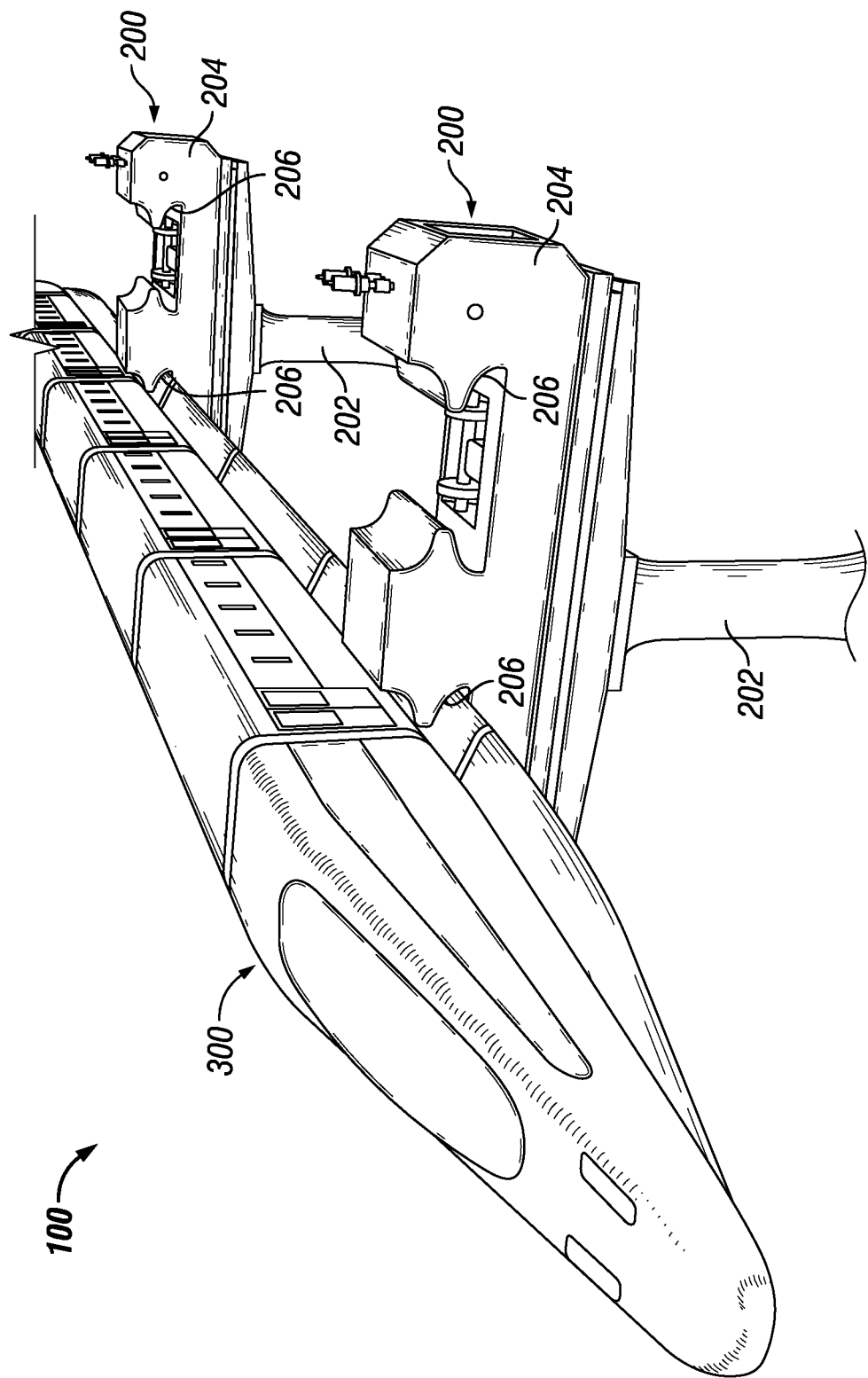
FIG. 1 is a perspective view from a top-down perspective of a portion of the ETran system.
Figure 2:
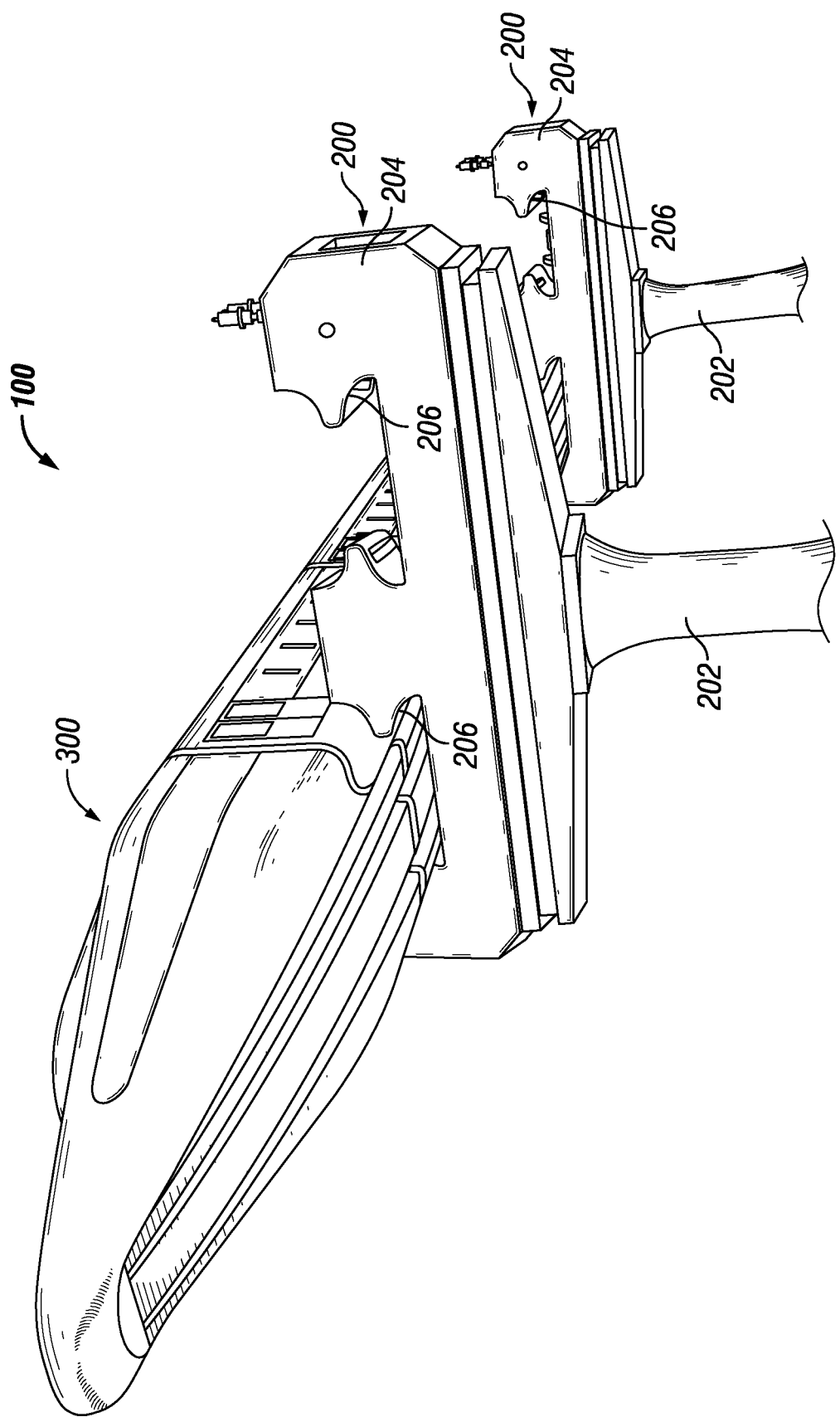
FIG. 2 is a perspective view from a bottom-up perspective of a portion of the ETran system.

The present disclosure can be better understood by the following discussion of the manufacture and use of certain preferred embodiments. Like reference numerals are used to describe like parts in all figures of the drawings.

FIG. 1 is a perspective of an ETran system 100. "ETran" as used herein is defined as an elevated transportation system. In one embodiment, the ETran system 100 comprises a transportation system line made up of a plurality of stanchions 200 on which the ETran fuselage 300 operates. Each stanchion 200 is constructed with a pillar 202 supporting a platform 204 that lifts the ETran fuselage 300 above ground level. Each stanchion can stand independently and is preferably not physically adjoined with other stanchions in the line, although two or more stanchions can be joined in certain circumstances. The stanchion 200 can be assembled on a foundation with a suspension system that protects the stanchion 200 against earthquakes and ground movements.

At least one groove 206 can be built into each platform 204. The groove 206 can be shaped to allow a portion of the vehicle to run within the groove 206. While the vehicle is in motion traversing over the stanchions 200, at any point in time only a portion of the ETran fuselage 300 is in contact with any particular stanchion 200. A motor (not shown) and two sets of rollers (not shown) mounted within each stanchion 200 propel the ETran fuselage 300 forward. The propulsion in each stanchion 200 can drive the ETran fuselage 300 with enough force to reach the next stanchion 200, which in turn provides enough motive force for the ETran fuselage 300 to reach the subsequent stanchion 200. The joint operation of the sequential stanchions 200 together can propel the ETran fuselage 300 down the pathway line created by at least three stanchions without a continuous steel rail running along a continuous roadbed or railway bridge. The stanchions can be built to any appropriate height, and in certain embodiments are adapted to provide clearance beneath the stanchions such that normal or conventional highway and rail traffic can operate under the platform without interference. The stanchions can thus be placed in existing right of ways of streets, highways or railroads, or across raw land without impeding movement of rail or automobile/truck traffic, or of livestock and wildlife. The land requirement or footprint of the ETran system 100 is therefore significantly reduced as compared to traditional railway systems.

The ETran system 100 operates by reconfiguring the function of the continuous rail and wheels found in a traditional railway system by removing the continuous rail altogether and moving, the wheels to rollers in fixed stanchions. Grooves built into each stanchion keep the ETran fuselage 300 secured at all times. By placing the wheel (now rollers) permanently on a fixed structure the ETran fuselage can itself bridge the space between the stanchions 200. The ETran system 100 uses the principle of the cantilever beam—a projection anchored at one end. Since the ETran fuselage 300 is moving within, and is held by, the support stanchions 200, the effect is to create a cantilever beam. The beam is fixed in its vertical orientation but flexible in its horizontal orientation. Therefore, the ETran fuselage 300 is constantly shifting from a cantilever beam on its ends to that of a post and beam (in its middle) and then back again, ensuring that the ETran fuselage 300 is gripped by three stanchions at all times.

A solar cell, wind turbines, fuel cell system or any other electric power generating device may be installed on the stanchion 200 to supplement the power requirements of the ETran system 100. The ETran system 100 can include battery banks, capacitors and/or any other devices to store electric power, or in certain embodiments one or more stanchions can be connected to a conventional public or private utility grid.

The spacing of the stanchions can vary depending on the topology or on the design and construction of fuselages for use with the stanchions. For example, particular ETran systems are designed for particular routes such as commuter routes, long distance routes, express routes, or freight routes that require higher or lower speed or a greater or lesser number of passengers can all incorporate a greater or lesser distance between stanchions and variations within the fuselage design. It is contemplated, however, that the maximum spacing of the stanchions 200 is adapted such that an ETran fuselage 300 used for that particular route can be supported and gripped by a minimum of three stanchions 200. This means the ETran fuselage 300 will never escape the grip created by the mechanisms in the stanchions 200. The maximum distance that can be spanned is a function of the length of the ETran fuselage 300, but the distance between support stanchions 200 does not have to be uniform; it may be shortened to avoid roads, pipelines or other infrastructure or geographic obstacles. This flexibility minimizes infrastructure disruption and thus greatly reduces costs of construction. The need for a continuous roadbed or continuous railroad bridge is thereby eliminated.

A locomotive or other form of internal propulsion source is eliminated entirely from the ETran fuselage 300 and replaced by a series of motor powered rollers mounted within the elevated stanchions 200, which have been set in concrete or other materials. Each motor merely helps advance the ETran fuselage 300 as far as the next supporting stanchion 200, the power of each motor is matched to its location and function (acceleration requires more power). The ETran system is always propelled by at least three motors at a time, coinciding with the minimum number of stanchions that are gripping the ETran fuselage 300 of the ETran.

Figure 3:
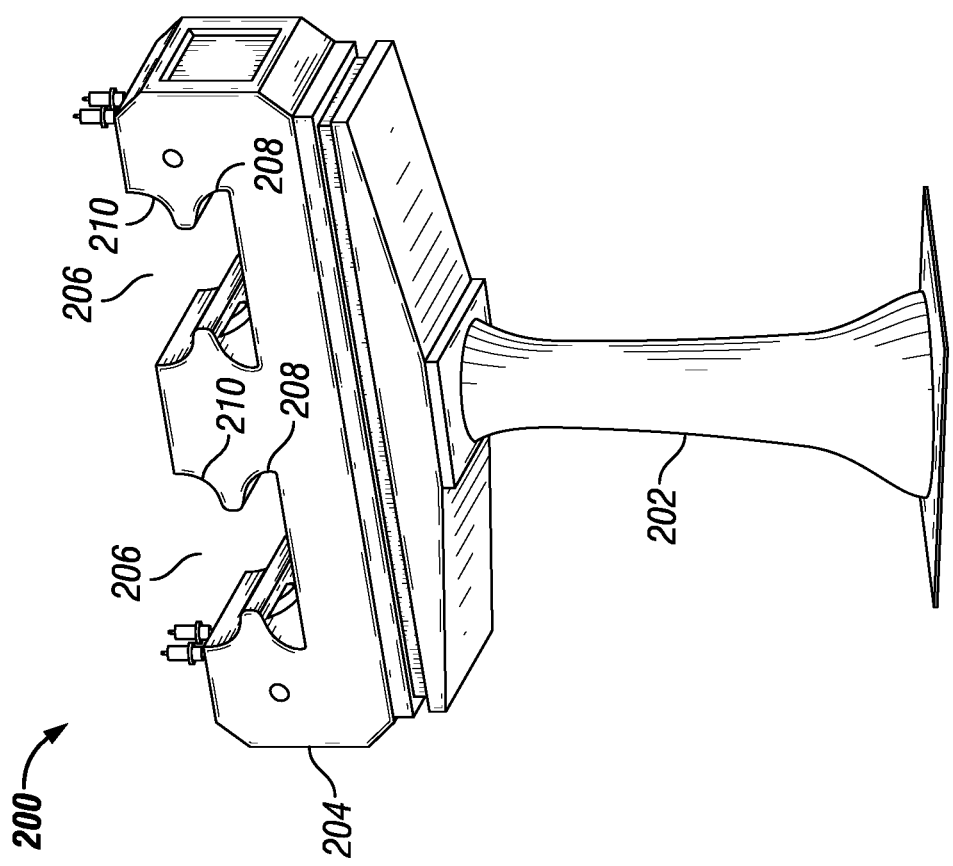
FIG. 3 is a perspective view from a bottom-up perspective of a stanchion used in the ETran system.
Figure 4:
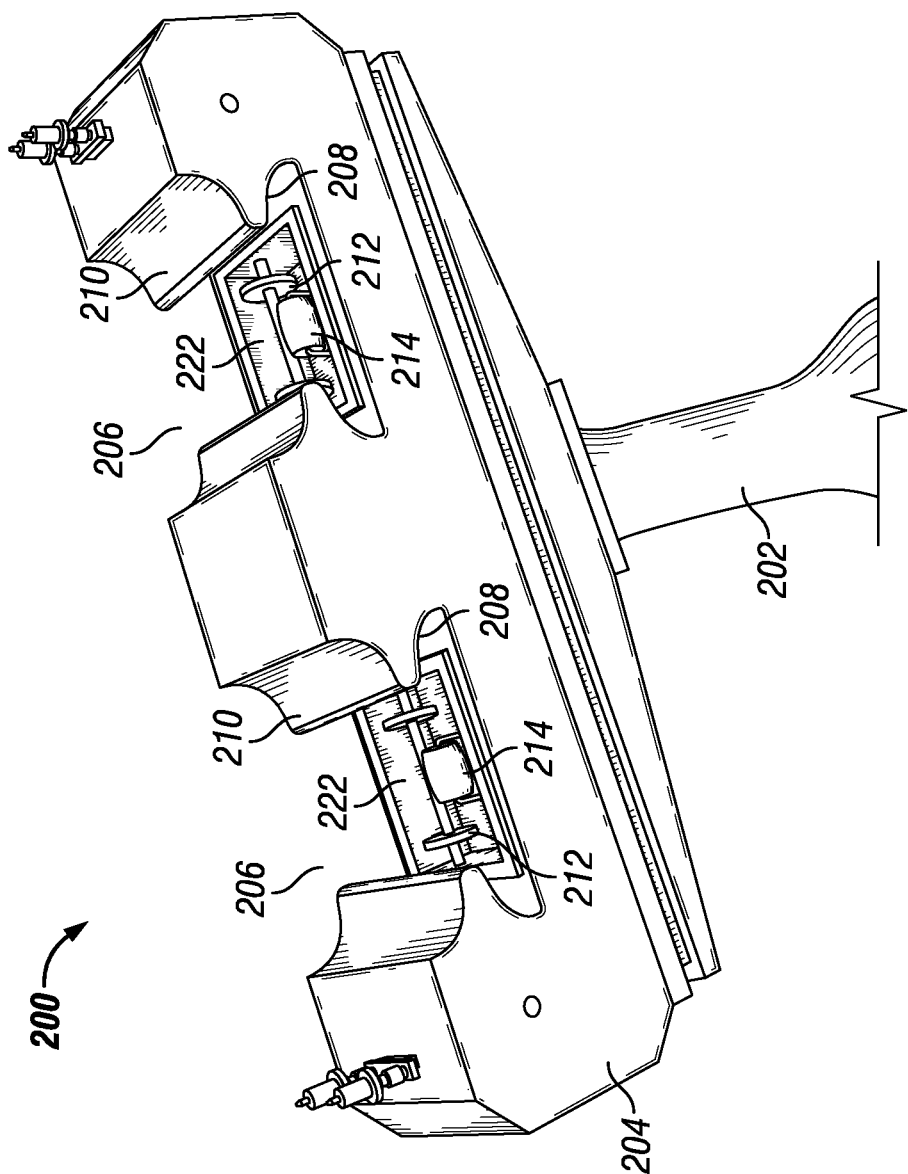
FIG. 4 is a perspective view from a top-down perspective of a stanchion used in the ETran system.

FIG. 3 is a perspective view from a bottom-up perspective of one embodiment of a stanchion used in the ETran system 100. FIG. 4 is a perspective view of the stanchion from a top-down perspective. In one embodiment the stanchion 200 comprises a pillar 202 that supports the platform 204 and has two grooves 206. Each groove 206 is constructed of a lower groove 208 and an upper groove 210. In this embodiment, the lower groove 208 viewed from a cross-sectional perspective is shaped to represent an inverted letter "U." The upper groove 210 viewed from a cross-sectional perspective is shaped to represent an upright letter "U." Together the lower groove 208 and the upper groove 210 function to allow a fuselage base 302 of the ETran fuselage 300 to traverse securely within.

Figure 5:
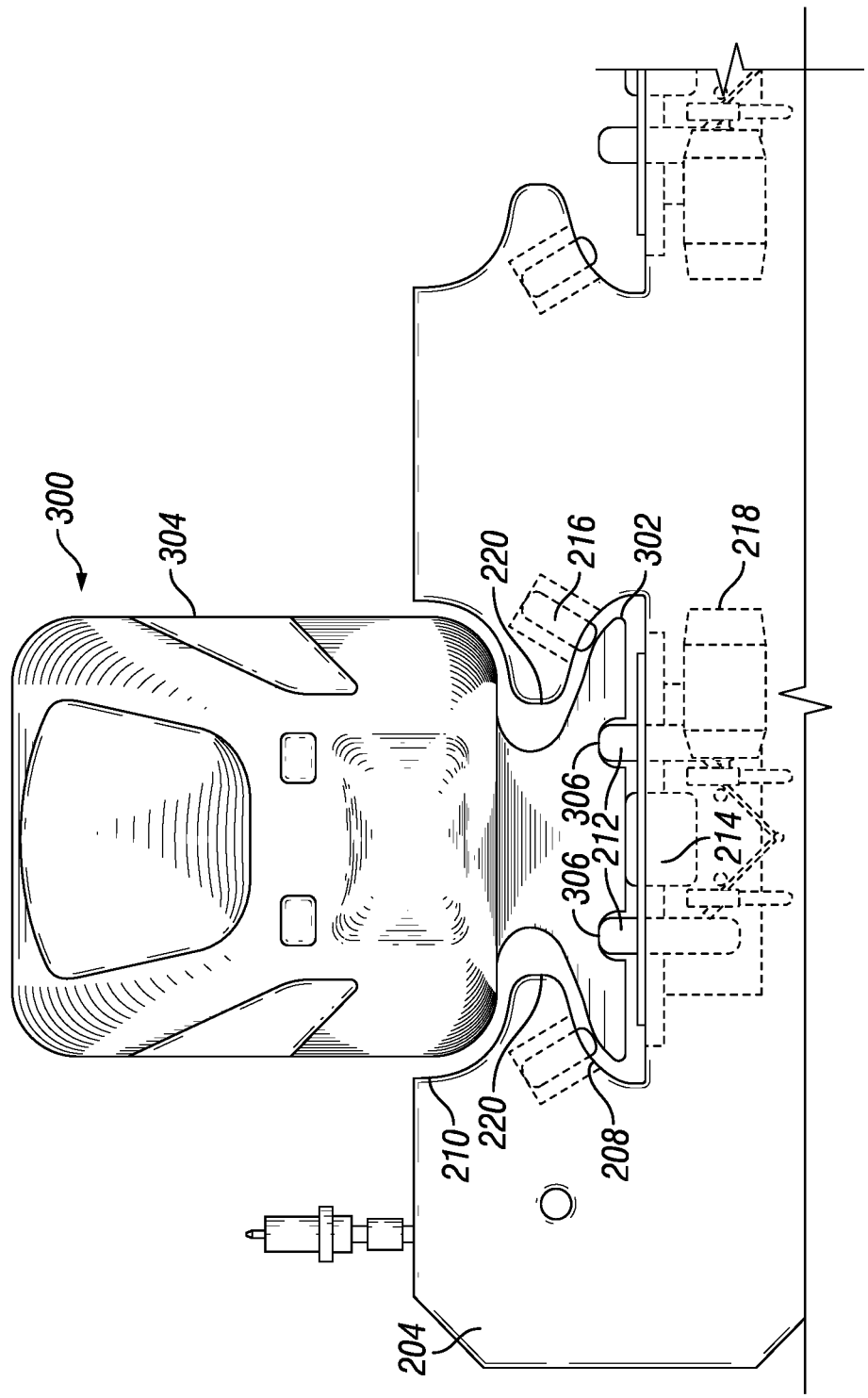
FIG. 5 is a cross-sectional view of a stanchion used in the ETran system and the ETran fuselage positioned within the stanchion.

FIG. 5 is a cross-sectional view of a stanchion 200 used in the ETran system 100 and the ETran fuselage 300 positioned within the stanchion 200. In this cross-sectional view, the ETran fuselage 300 is shown clasped within the groove 210. A majority of the fuselage base 302 of the ETran fuselage 300 travels within the lower groove 208. All surfaces of the fuselage base 302, although proximate, are not in direct contact with the walls of the upper groove 210 and the lower groove 208. Rather running rails 306 traversing along the entire length of the body rail 302 are in contact with sets of rollers 212 and 214. The lower groove 208 has an upper surface and a bottom surface. The upper surface of the lower groove is curved and gradually tapers at one end to meet at a point 220 with each end of the bottom surface of the lower groove.

Referring back to FIG. 4, the sets of rollers 212 and 214 are mounted within an opening 222 set into the bottom surface of the lower groove 208. Now referring again to FIG. 5, at least the set of rollers 212 are mounted such that a portion of an upper hemisphere of the roller 212 protrudes above the bottom surface of the lower groove 208 while a lower hemisphere of the set of rollers 212 is mounted below the bottom surface of the lower groove 208. The set of rollers 212 and 214 can be made of steel or any material that is capable of withstanding rigorous frictional, thermal and compressional forces over an extended period of operation. Another set of rollers 216 are mounted on the upper surface of the lower groove 208. The set of rollers 216 are in contact with a declined upper surface of the fuselage base 302 and assist in suspension and guidance of the fuselage. In certain embodiments, the rollers 216 and 208 can be adapted to generate an electromagnetic field effective to repel the surface of the fuselage base, thus providing a frictionless guidance system for the fuselage. The two sets of rollers 212 and 214 can be connected to a motor 218 that operates to drive the two sets of rollers 212 and 214. The action of the spinning sets of rollers 212 and 214 can provide the propulsion force that drives the ETran fuselage 300 forward by tracking on the running rails 306. The spinning set of rollers 216 acting against the upper surface of the lower groove 208 also work in tandem to guide the ETran fuselage 300 forward.

Figure 6:
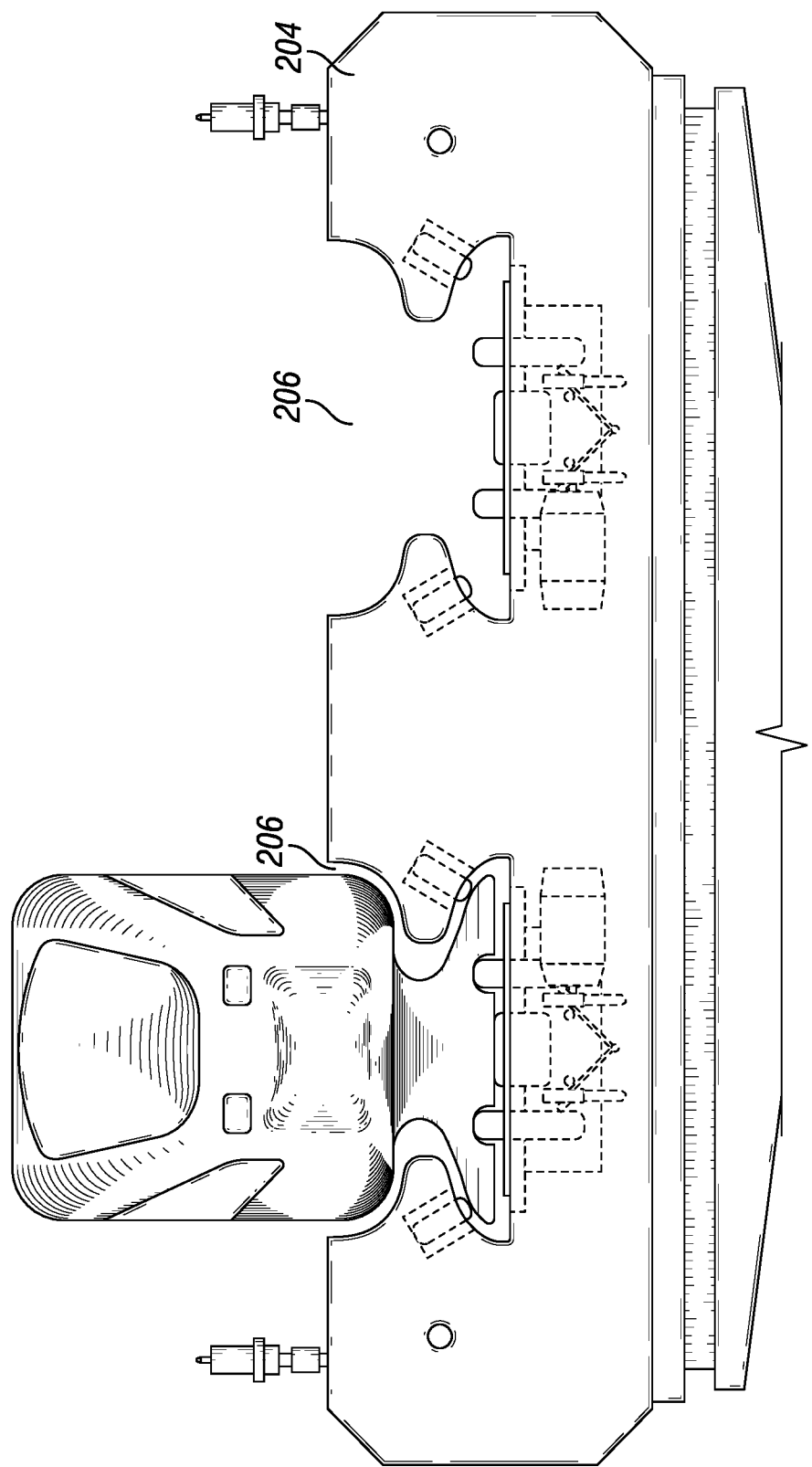
FIG. 6 is a cross-sectional view of another embodiment of a stanchion used in the ETran system.

FIG. 6 is a cross-sectional view of another embodiment of a stanchion used in the ETran system 100. In this embodiment, the stanchion 200 has a platform 204 that can be expanded to accommodate two grooves 206 that are constructed side-by-side to each other. Each groove 206 can be constructed in an identical manner thereby allowing two separate ETran fuselages 300 to simultaneously pass over a single stanchion 200. The ETran fuselages can be passing over the same stanchion 200 traveling in the same direction or in opposite directions as needed. Although this embodiment shows a platform 204 holding two grooves 206, the present disclosure may contain more grooves 206 to facilitate the simultaneous operation of multiple fuselages 300 over a single stanchion 200. In this embodiment, a single ETran line can be constructed using a plurality of stanchions 200 with grooves 206 that allow for the simultaneous operation of multiple ETran fuselages on the single pathway line.

In another embodiment of the stanchion 200, the platform 204 houses a magnetic force generator (not shown) that creates a magnetic field. The magnetic field can levitate the ETran fuselage 300 in a horizontal direction, thus maintaining the ETran fuselage 300 perfectly centered in the groove 206, making for a more comfortable ride and reducing the friction on the side rollers. The magnetic field also can levitate the ETran fuselage 300 in a vertical direction, to a certain extent, that reduces the downward force exerted by the weight of the Etran fuselage 300 as it is running through the groove 206 and through the stanchion 200, thus reducing the friction and power requirements of the system. The assembly of the groove 206 to the stanchion 200 is adjustable and can include a suspension system and/or an alignment system.

Figure 7:
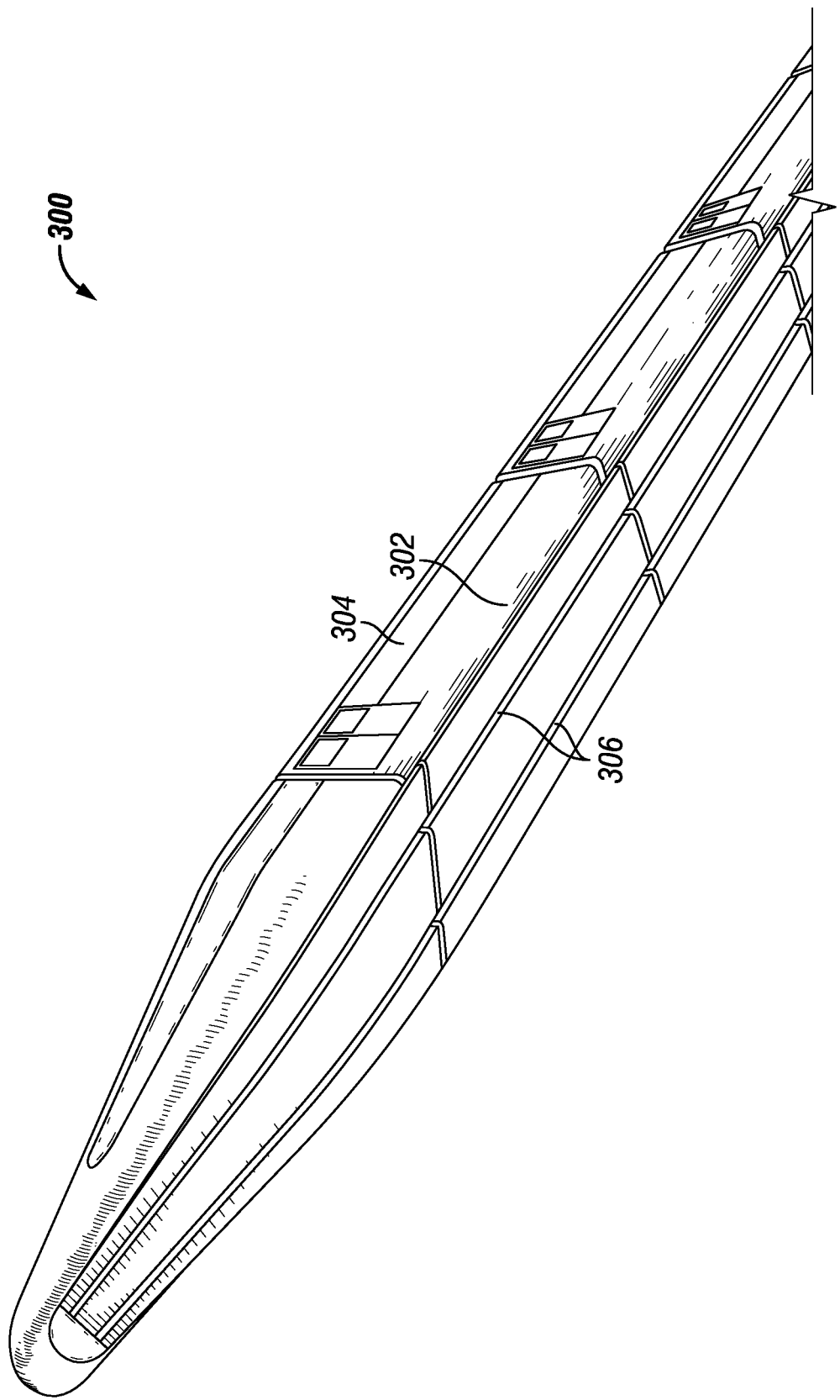
FIG. 7 is a perspective view from a bottom-up perspective of the ETran fuselage.
Figure 8:
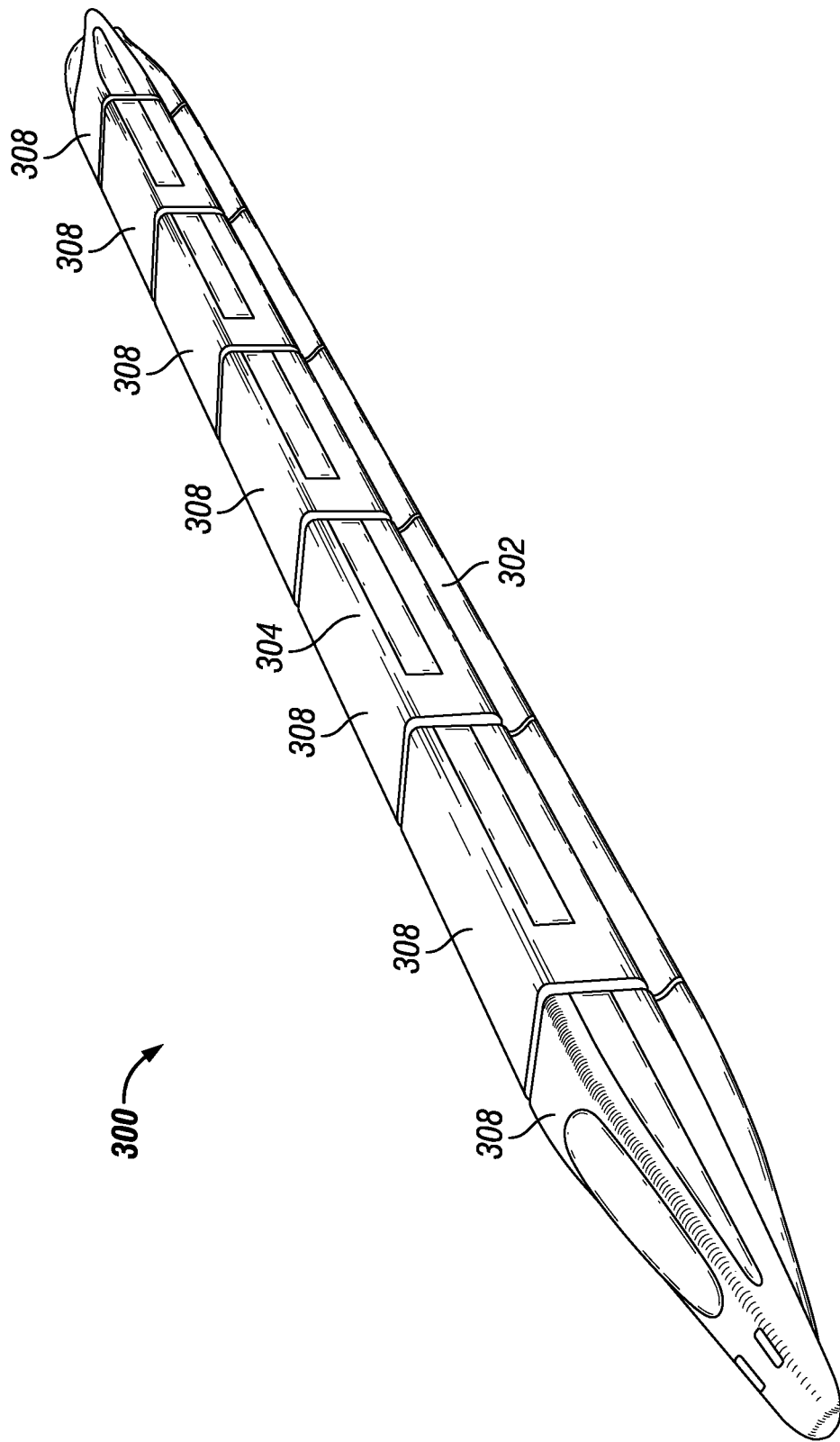
FIG. 8 is a perspective view from a top-down perspective of the ETran fuselage.
Figure 9:
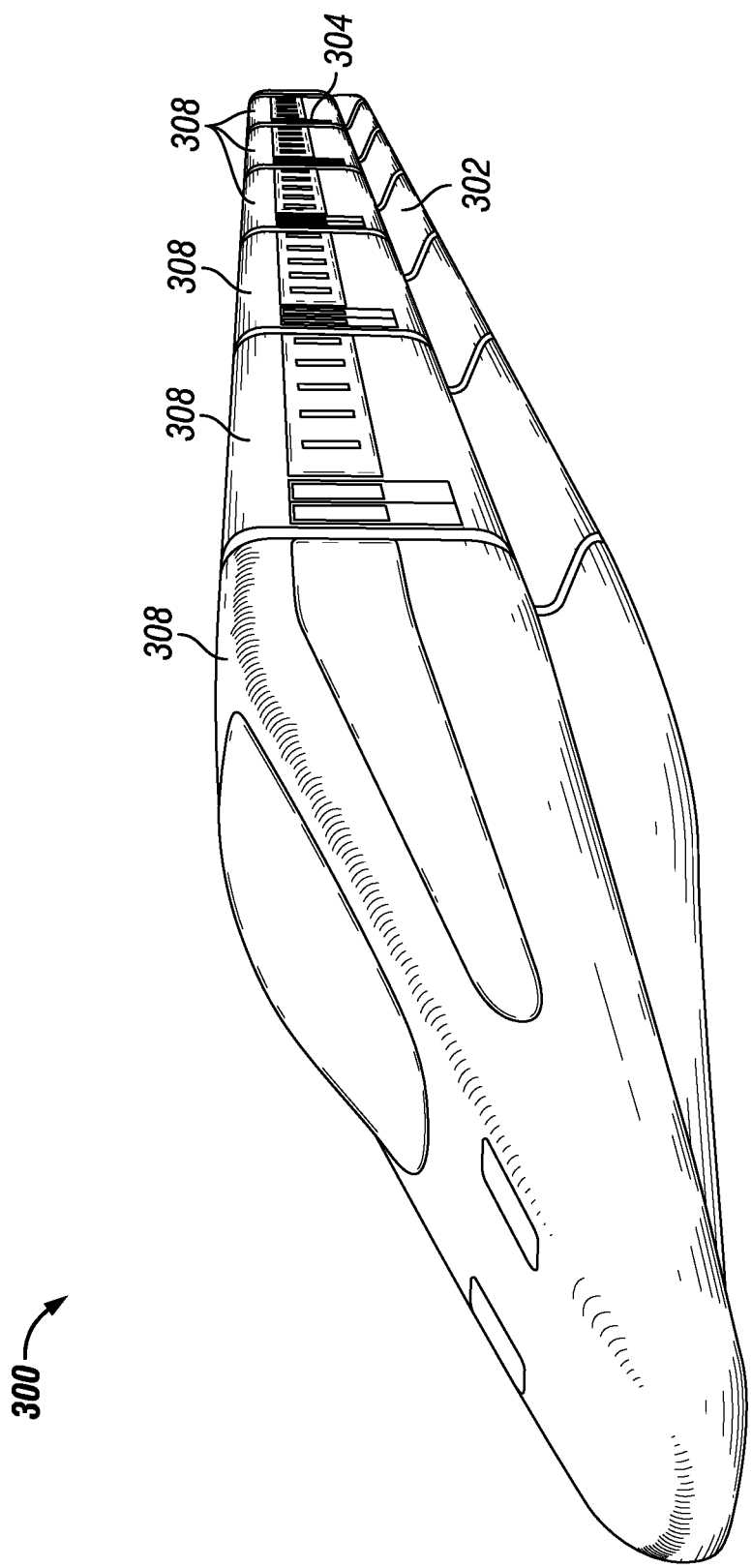
FIG. 9 is a perspective view from a side perspective of the ETran fuselage.
Figure 10A:
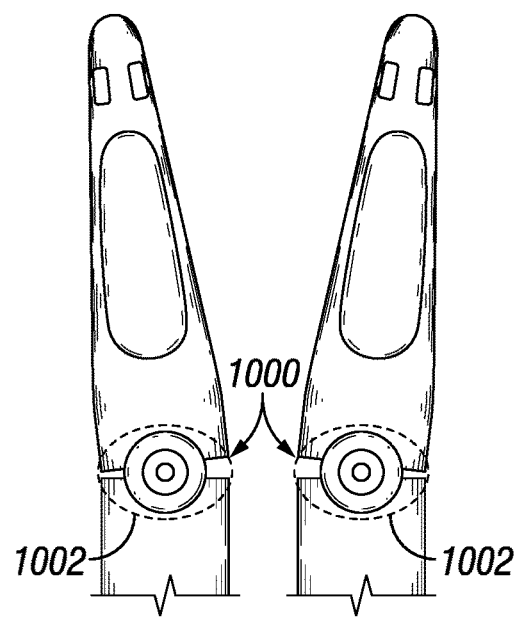
FIG. 10A is a top-down view of an articulation joint.
Figure 10B:
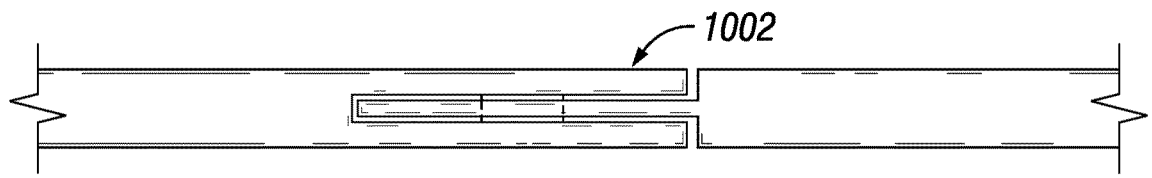
FIG. 10B is a schematic from a side view of the articulation joint.
Figure 10C:
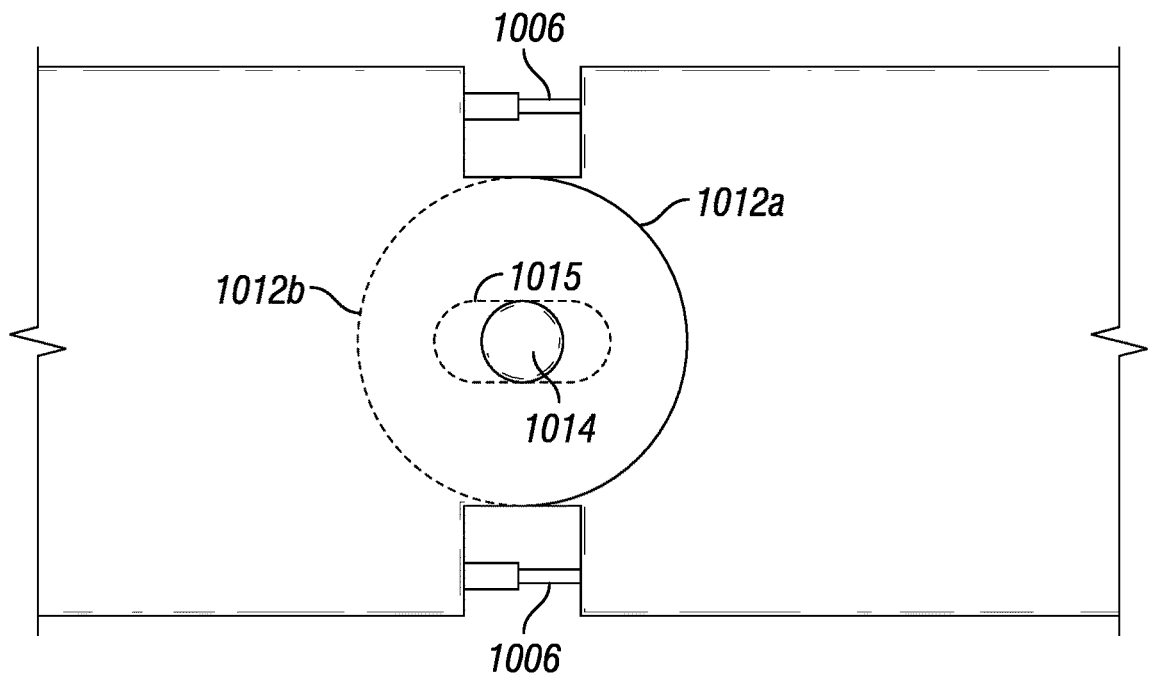
FIG. 10C is a schematic from a top view of the articulation joint.
Figure 11A:
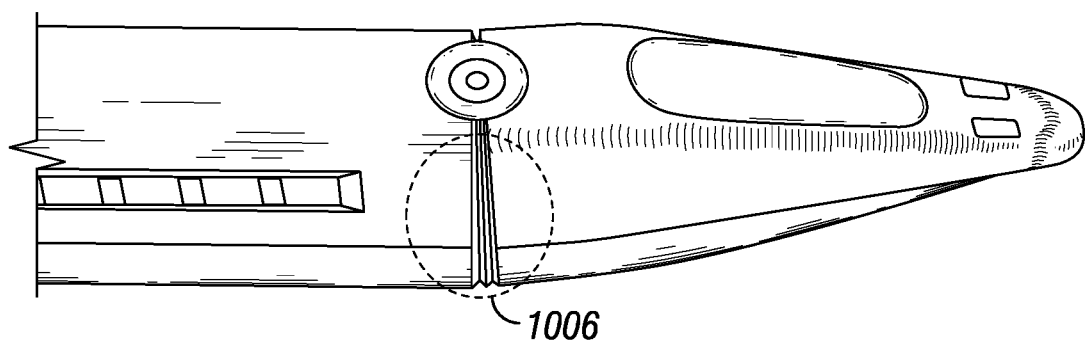
FIG. 11A is a perspective view of an articulation joint.
Figure 11B:
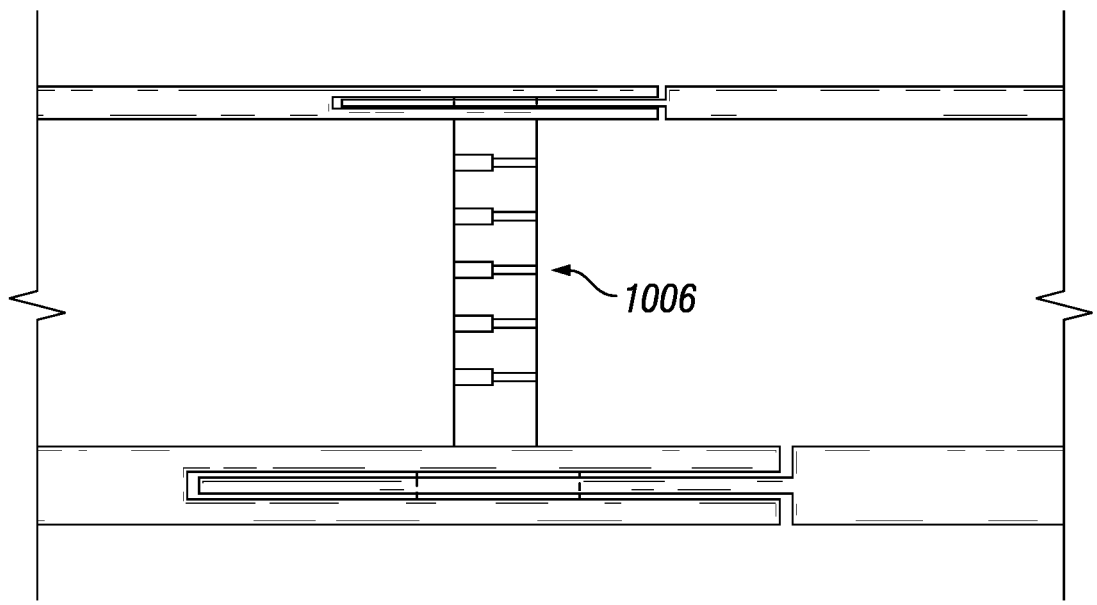
FIG. 11B is a schematic from a side view of the articulation joint.
Figure 12A:
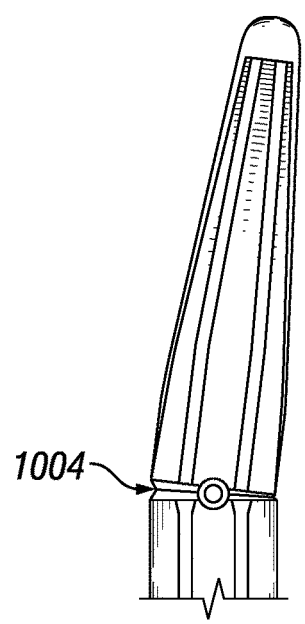
FIG. 12A is a bottom-view of an articulation joint.
Figure 12B:
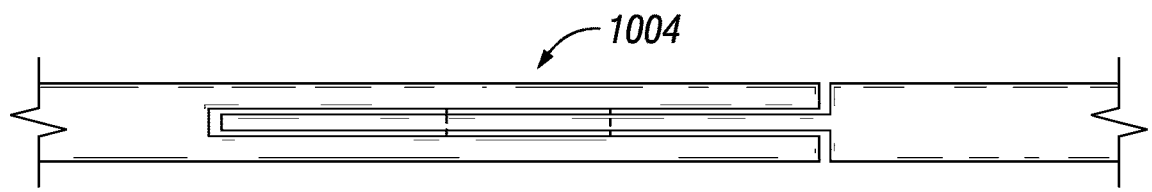
FIG. 12B is a schematic from a side view of the articulation joint.
Figure 12C:
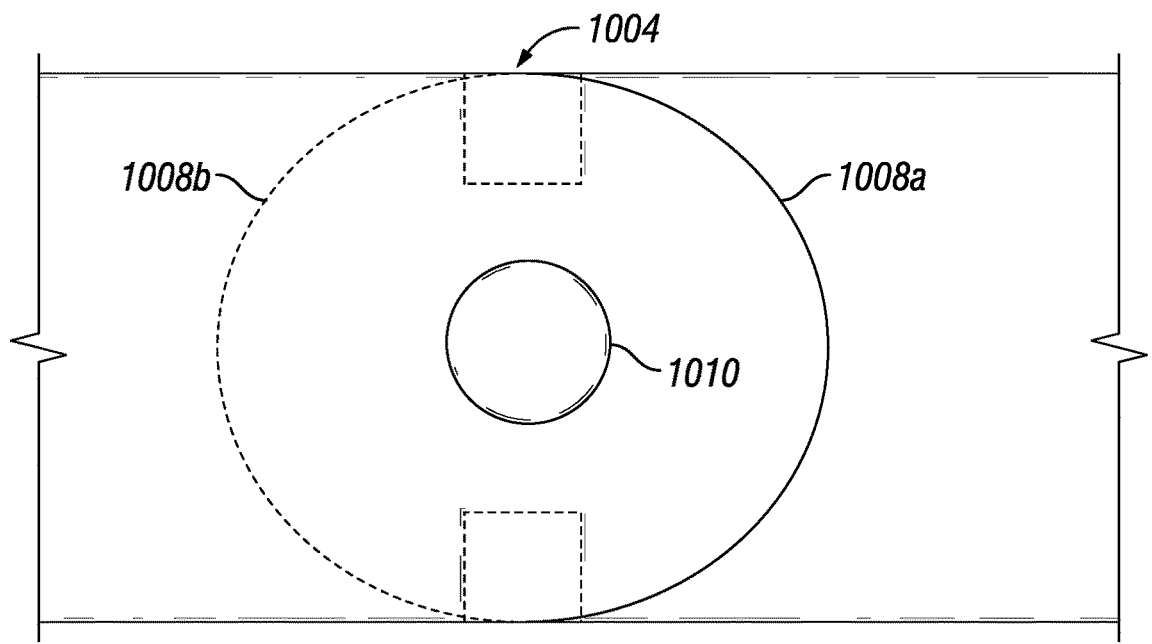
FIG. 12C is a schematic from a bottom view of the articulation joint.

FIG. 7 is a perspective view from a bottom-up perspective of the ETran fuselage 300. Referring now to FIG. 8, the ETran fuselage 300 can be seen with compartments 308 that may hold passengers or freight. All compartments 308 can be passenger, freight or other use compartments. Available for multiple uses, none of the compartments 308, however, need to host an engine or other propulsion generating device as the fuselage 300 does not independently generate any force to propel itself forward or backward. The primary motive force can be provided by the two spinning set of rollers 212 and 216 mounted within the plurality of stanchions 200 acting in coordination. The compartments 308 are combined together to form the ETran fuselage 300 with an upper fuselage body 304.

The fuselage base 302 can be constructed having a generally symmetrical cross-section running along the entire length of the ETran fuselage 300 below the upper fuselage body 304. Referring to FIG. 7, the running rails 306 can be formed in the bottom surface of the fuselage base 302 and run the entire length of the fuselage base 302, allowing the sets of rollers 212 and 214 to propel the ETran fuselage 300 forward by running along the running rails 306. The symmetrical cross-sectional shape of the fuselage base 302 can be formed with an upper portion proximate to the upper fuselage body 304 and a lower portion distal from the upper fuselage body 304. The lower portion of fuselage base 302 can be formed wider than the upper portion and can extend laterally to form a set of stabilization tips. The stabilization tips can have an upper sloping surface and a lower horizontal surface. The upper sloping surface of the stabilization tips can be adapted such that operation of the rollers 216 provides a downward stabilization force on the stabilization tips. This downward stabilization force, acting in conjunction with the upward stabilization force generated by the set of rollers 212 and 214 together generate a retaining force on the ETran fuselage base 302 (and consequently the upper ETran body fuselage 304) within the stanchion 200 as the ETran fuselage 300 is passing through.

FIG. 10A through FIG. 12C are various views of the articulation joint 1000. The articulation joint 1000 can be provided between each adjoining compartment 308 of the Etran fuselage 300. The articulation joint 1000 can include an upper mechanical articulation 1002, lower mechanical articulation 1004, and at least two sets of active actuators.

The lower mechanical articulation 1004 can be located on the bottom of the fuselage base 302 and can include two rigid elements 1008a and 1008b. The two rigid elements 1008a and 1008b can interlock around a center pivot 1010. The two rigid elements 1008a and 1008b can allow each articulation joint 1000 to have horizontal movement and a slight vertical displacement.

The upper mechanical articulation 1002 on the top of the ETran fuselage 300 can also include two interlocking rigid elements 1012a and 1012b on each articulation joint 1000 and interlocked around a center pivot 1014 that can be fixed to a portion extending from one of the compartments 308 to form a slot 1015, allowing for horizontal movement as well as a sliding forward and backward movements, providing flexibility for the ETran to move downhill or to climb grades.

The set of actuators 1006 can be rigid elements that can lock and configure a section of the ETran fuselage 300 in a position to glide through the groove 206 on each stanchion 200. The set of actuators 1006 can be controlled by a central system. The number of actuators within the set can be established based on the requirement for the ETran fuselage 300 to move vertically and/or horizontally. One set of actuators 1006 can be provided for each side of the ETran fuselage 300 between the different compartments 308.

The fuselage body 300 can have an emergency exit (not shown) and an inflatable slide (not shown), to evacuate the ETran fuselage 300 in the event of an emergency.

The ETran system 100 can be designed for a wide variety of applications, as Inter-City, Intra-City, High Speed, Mid Speed, Low Speed, Light Rail, Mail and Light Cargo, as well as special applications such as transport in airports, industrial parks, medical centers, amusement parks, etc.

A energy supply system for the ETran fuselage 300 can be built into the stanchion 200.

The Etran system 100 can have an active suspension system to reduce vibrations and make the ride more comfortable.

The Etran fuselage 300 can have solar cells, fuel cells, or other electric power generating devices on the roof, to supplement its power requirements.

The Etran system 100 can have custom designed control systems for propulsion, braking, energy, laser alignment, actuators, security, logistics, and general line operation.

The Etran system can further include a centralized control center including computerized tracking, scheduling and monitoring of the Etran system. The control center can include a networked system of hardware and software that communicates with one or more stanchions to activate or deactivate the motive force, to receive GPS information from Etran fuselages and/or feedback from RF or cellular transmitters located on one or more stanchions to track the movement along the routes of travel, to generate scheduling information, or responses regarding routes which can be changed to respond to peak times, peak destinations or to alter or shut down the system or a part of the system in the case of emergency or other unexpected events. The control center can further include a computer generated graphical representation of the entire Etran system, or a portion of the system for monitoring and control. The central control center can also include, or be networked with computers that monitor and/or conduct ticket sales, ticket redemption, and statistics regarding ridership or other matters. Such networked computers can be connected by hardwire, wireless networks, or through the world wide web, for example.

Although the disclosure has been described relative to preferred embodiments, any and all embodiments described herein can be provided individually or in any combination of such embodiments, except to the extent that it may be stated otherwise or to the extent that any such embodiments might be mutually exclusive in function and/or structure.

Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. Unless otherwise specifically stated, the terms and expressions have been used herein as terms of description and not terms of limitation. There is no intention to use the terms or expressions to exclude any equivalent of features shown and described or portions thereof and this disclosure should be defined in accordance with the claims that follow.

What is claimed is:

1. A transportation system comprising:
   a vehicle body further comprising:

an upper vehicle body and a lower vehicle body; and
a plurality of compartments respectively connected to each other by an articulating joint between adjacent compartments, the articulating joint further comprising:
an upper mechanical articulation that interlocks between adjacent compartments at an upper surface of the upper vehicle body;
a lower mechanical articulation that interlocks between adjacent compartments at a lower surface of the upper vehicle body; and
a pivot line between adjacent compartments about which the upper mechanical articulation and the lower mechanical articulation are enabled to rotate horizontally;
a plurality of stanchions spaced apart to provide a transportation system route, wherein each stanchion comprises:
a pillar comprising a top end and a bottom end wherein the bottom end is secured to the ground or a foundation base;
a platform attached to the top end of the pillar, wherein the platform further comprises:
an upper groove and a lower groove formed in the platform, wherein the lower groove comprises a top surface and a bottom surface; and
wherein the upper groove is adapted to receive the upper vehicle body and the lower groove is adapted receive the lower vehicle body;
a first set of rollers located proximate to the bottom surface of the lower groove and adapted to contact the lower vehicle body when the upper vehicle body passes through the upper groove;
a second set rollers mounted proximate to the top surface of the lower groove and adapted to contact the lower vehicle body when the upper vehicle body passes through the upper groove;
an electric motor enabled to provide motive force to the at least one roller in the first set of rollers to propel the vehicle body; and
a centralized control system in communication with the plurality of stanchions and the vehicle body, the centralized control system further enabled to control respective motors associated with each stanchion of the plurality of stanchions to enable the vehicle body to travel the transportation route.

2. The transportation system of claim 1, wherein the stanchions are spaced apart at a distance such that the vehicle body traveling on the transportation route is supported by at least three (3) stanchions at all times.

3. The transportation system of claim 1, wherein the pivot line is a vertical line associated with at least one linear actuator coupled to each of the adjacent compartments coupled by the articulated joint, wherein the at least one linear actuator is adapted to horizontally rotate the adjacent compartments about the pivot line.

4. The transportation system of claim 3, wherein the at least one linear actuator is adapted to vertically tilt the adjacent compartments, wherein the pivot line is enabled to tilt from the vertical line at the upper mechanical articulation and the pivot line is enabled to remain fixed at the lower mechanical articulation.

5. The transportation system of claim 3, wherein the at least one linear actuator is selected from at least one of: a mechanical actuator, an electromagnetic actuator, and a hydraulic actuator.

6. The transportation system of claim 1, wherein the motive force provided by the at least one roller using the electric motor at each respective stanchion over which the vehicle body travels is the only propulsion force to propel the vehicle body traveling along the transportation route.

7. The transportation system of claim 1, wherein at least one of the compartments is adapted to transport human passengers.

8. The transportation system of claim 1, wherein at least one of the compartments is adapted to transport freight or cargo.

9. The transportation system of claim 1, further comprising:
a laser source located at a first stanchion; and
a laser sensor located at a second stanchion adjacent the first stanchion and aligned to the laser source, wherein the laser sensor is operable to detect a misalignment between the first stanchion and the second stanchion.

10. A stanchion adapted to support a vehicle body, the stanchion comprising:
a pillar comprising a top end and a bottom end wherein the bottom end is secured to the ground or a foundation base; and
a platform attached to the top end of the pillar, wherein the platform further comprises:
an upper groove and a lower groove formed in the platform, the lower groove having an upper surface and a bottom surface, wherein the upper groove is adapted receive an upper body portion of a vehicle body and the lower groove is adapted receive a lower body portion of the vehicle body;
a first set of rollers located proximate to the bottom surface of the lower groove and adapted to contact the lower body portion when the upper body portion passes through the upper groove;
a second set rollers mounted proximate to the upper surface of the lower groove and adapted to contact the lower body portion when the upper body portion passes through the upper groove;
an electric motor enabled to provide motive force to at least one roller in the first set of rollers to propel the vehicle body,
wherein the stanchion is adapted for use in a transportation system including a plurality of stanchions along a transportation route, including the stanchion, and wherein the plurality of stanchions, including the stanchion, are controlled by a centralized control system in communication with the plurality of stanchions and a vehicle body, the centralized control system further enabled to control respective electric motors associated with each of the plurality of stanchions, including the stanchion, to enable the vehicle body to travel the transportation route.

11. The stanchion of claim 10, wherein the vehicle body further comprises a plurality of compartments connected to each other by an articulating joint between adjacent compartments, the articulating joint having a pivot point between adjacent compartments.

12. The stanchion of claim 10, wherein the electric motor coupled to at least one roller in the first set of rollers is enabled to propel the vehicle body in a forward direction and a reverse direction.

13. The stanchion of claim 11, wherein the motive force provided by the at least one roller using the electric motor, respectively, at each of the plurality of stanchions, including the stanchion, over which the vehicle body travels is the only propulsion force to propel the vehicle body traveling along the transportation route.

14. The stanchion of claim 10, wherein the second set of rollers is enabled to provide a downward stabilization force to the vehicle body.

15. The stanchion of claim 10, wherein the top end further comprises a second upper groove and a second lower groove, the second lower groove including a third set of rollers coupled to a second motor enabled to propel a second vehicle body independent of the vehicle body.

16. A vehicle body supported by the stanchion of claim 10, the vehicle body comprising:
a plurality of compartments respectively connected to each other by an articulating joint between adjacent compartments, the articulating joint further comprising:
an upper mechanical articulation that interlocks between adjacent compartments at an upper surface of an upper body of the vehicle body;
a lower mechanical articulation that interlocks between adjacent compartments at a lower surface of the upper body; and
a pivot line between adjacent compartments about which the upper mechanical articulation and the lower mechanical articulation are enable to rotate horizontally;
an underbody formed underneath the plurality of compartments and extending along the length of the vehicle body, the underbody forming a bottom surface of the vehicle body and further comprising a running rail formed as at least one indentation along the bottom surface, the indentation adapted to receive motive force to propel and brake the vehicle body from a terrestrial propulsion system associated with a transportation route traveled by the vehicle body; and
an electrical communication system enabled to communicate with a centralized control system in communication with the terrestrial propulsion system, the centralized control system further enabled to control the motive force applied to the underbody to enable the vehicle body to travel the transportation route,
wherein the vehicle body is not enabled for self-propulsion.

17. The vehicle body of claim 16, wherein the underbody including the bottom surface and the running rail are configured to mate with a groove in the terrestrial propulsion system, the groove including rollers driven by an electric motor, the rollers contacting the vehicle body at the running rail.

18. The vehicle body of claim 16, wherein the groove is located at a top portion of a first stanchion, wherein the transportation route includes a plurality of stanchions, including the first stanchion.

19. The vehicle body of claim 16, wherein the train underbody is formed with an upper portion proximate to the compartments and a lower portion distal from the compartments, the lower portion being wider than the upper portion and extending laterally outwards to form stabilization tips.

20. The vehicle body of claim 16, wherein the pivot line is a vertical line associated with at least one linear actuator coupled to each of the adjacent compartments coupled by the articulated joint, wherein the at least one linear actuator is adapted to horizontally rotate the adjacent compartments about the pivot line.

21. The vehicle body of claim 20, wherein the at least one linear actuator is adapted to vertically tilt the adjacent compartments, wherein the pivot line is enabled to tilt from the vertical line at the upper mechanical articulation and the pivot line is enabled to remain fixed at the lower mechanical articulation.

22. The vehicle body of claim 20, wherein the actuators are controlled remotely at the centralized control system using the electrical communication system.

23. A vehicle supported by the stanchion of claim 10, the vehicle comprising:
a plurality of compartments that are linearly connected to form a vehicle body, wherein adjacent compartments of the plurality of compartments are respectively connected by articulating joints;
a body base formed under the vehicle body and extending along the length of the vehicle body; and
a running rail formed as an indentation along a bottom surface of the body base, the indentation adapted to contact at least one powered roller effective to propel the vehicle.

24. The vehicle of claim 23, wherein the body base is formed with an upper portion proximate to the vehicle body and a lower portion distal from the vehicle body, the lower portion being wider than the upper portion and extending laterally outwards to form stabilization tips.

25. The vehicle of claim 23, wherein at least one of the articulation joints further comprises:
an upper mechanical articulation and a lower mechanical articulation;
at least two linear actuators coupled to each of the adjacent compartments;
wherein the upper mechanical articulation and the lower mechanical articulation respectively further comprise:
two or more rigid elements that interlock with each other; and
a center pivot.

26. The vehicle of claim 25, wherein the lower mechanical articulation is located at a bottom portion of the vehicle body.

27. The vehicle of claim 25, wherein the rigid elements interlock around the center pivot.

28. The vehicle of claim 25, wherein the upper mechanical articulation is located at a top portion of the vehicle body.

29. The vehicle of claim 23, further comprising:
an electrical communication system enabled to communicate with a centralized control system in communication with a terrestrial propulsion system including the powered rollers, the centralized control system further enabled to control the motive force applied to the running rail to propel the vehicle along a transportation route including the terrestrial propulsion system.

30. The vehicle of claim 29, wherein the linear actuators are controlled remotely by the centralized control system using the electrical communication system.

* * * * *